(12) United States Patent
Liu

(10) Patent No.: US 6,726,226 B2
(45) Date of Patent: Apr. 27, 2004

(54) WHEEL STOP DEVICE OF A GOLF CART

(76) Inventor: Chong-Yong Liu, 58, Ma Yuan West St., Taichung (TW)

( * ) Notice: Subject to any disclaimer, the term of this patent is extended or adjusted under 35 U.S.C. 154(b) by 91 days.

(21) Appl. No.: 10/104,797

(22) Filed: Mar. 21, 2002

(65) Prior Publication Data

US 2003/0178815 A1 Sep. 25, 2003

(51) Int. Cl.[7] .............................. B62B 1/00; B62B 3/00; B62D 39/00; B60B 33/00; B61K 7/20
(52) U.S. Cl. ................................ 280/47.26; 280/47.27; 280/645; 280/33.994; 280/DIG. 6; 188/1.12; 188/60
(58) Field of Search .......................... 188/1.12, 60, 69; 74/560, 512; 280/47.38, 47.39, 47.27, 87.051, 650, 639, 33.994, 47.26, 645; 297/5

(56) References Cited

U.S. PATENT DOCUMENTS

| | | | | |
|---|---|---|---|---|
| 4,527,665 A | * | 7/1985 | Shamie ........................ 188/20 |
| 5,113,977 A | * | 5/1992 | Ridings et al. ................ 188/69 |
| 5,232,071 A | * | 8/1993 | Kawanabe .................. 188/1.12 |
| 5,432,412 A | * | 7/1995 | Harris et al. .................... 318/3 |
| 6,341,672 B1 | * | 1/2002 | Yang et al. .................... 188/20 |
| 6,360,851 B1 | * | 3/2002 | Yang .......................... 188/1.12 |
| 6,510,927 B1 | * | 1/2003 | Wu .............................. 188/31 |

* cited by examiner

*Primary Examiner*—Brian L. Johnson
*Assistant Examiner*—Gerald B Klebe

(57) ABSTRACT

A wheel stop device of a golf cart includes a fixing seat, a connecting rod, a spring, a fixing ring, and a drive member. The fixing seat includes a main body, an outer jacket, and two opposite lugs. The connecting rod has a shank having a first end formed with a stop end and a second end formed with a screw portion. The drive member includes a press portion and a drive portion. The press portion has a front end face formed with an end face and an oblique end face and has a sidle protruded with two spaced opposite oblong ears and a clamping recess formed between the two spaced opposite oblong ears.

6 Claims, 7 Drawing Sheets

WHEEL STOP DEVICE OF A GOLF CART

BACKGROUND OF THE INVENTION

1. Field of the Invention

The present invention relates to a wheel stop device of a golf cart, and more particularly to a wheel stop device of a golf cart, wherein the drive portion of the drive member may be directly moved by the user's one foot, so that the stop end of the connecting rod may be locked between the spokes of the wheel of the golf cart, thereby locking the wheel and stopping movement of the wheel.

2. Description of the Related Art

A conventional two-wheel type golf cart in accordance with the prior art comprises a main rod having a mediate portion provided with an upper support base and a lower end provided with a bottom support base. Each of the upper support base and the bottom support base is provided with a snap strap for securing the golf bag and the club set. The main rod is provided with a wheel frame which is provided with two wheels. A conventional three-wheel type golf cart in accordance with the prior art comprises a main rod having a mediate portion provided with a wheel frame which is provided with two rear wheels, and a lower end provided with a front wheel.

However, the wheels of the conventional golf cart is not provided with a stop device to stop movement of the wheels, so that when the conventional golf cart is placed on a slope, the wheels cannot be fixed efficiently, so that the wheels easily rotate and move, and so that the golf cart easily falls down.

SUMMARY OF THE INVENTION

The present invention has arisen to mitigate and/or obviate the disadvantage of the conventional golf cart.

The primary objective of the present invention is to provide a wheel stop device of a golf cart, wherein the drive portion of the drive member may be directly moved by the user's one foot, so that the stop end of the connecting rod may be locked between the spokes of the wheel of the golf cart, thereby locking the wheel and stopping movement of the wheel.

In accordance with the present invention, there is provided a wheel stop device of a golf cart, comprising a fixing seat, a connecting rod, a spring, a fixing ring, and a drive member, wherein:

the fixing seat includes a main body, an outer jacket, and two opposite lugs, the main body has an inside formed with a hollow receiving chamber which has a side wall formed with a through hole which has one end formed with a recess;

the connecting rod is mounted in the through hole of the receiving chamber of the fixing seat, and has a shank having a first end formed with a stop end and a second end formed with a screw portion;

the spring is mounted on the shank of the connecting rod;

the fixing ring is mounted on the shank of the connecting rod to mate with the spring; and the drive member includes a press portion and a drive portion, the press portion has a front end face formed with an end face and an oblique end face, the press portion has a side protruded with two spaced opposite oblong ears and a clamping recess formed between the two spaced opposite oblong ears.

Further benefits and advantages of the present invention will become apparent after a careful reading of the detailed description with appropriate reference to the accompanying drawings.

DETAILED DESCRIPTION OF THE INVENTION

Figure 1:
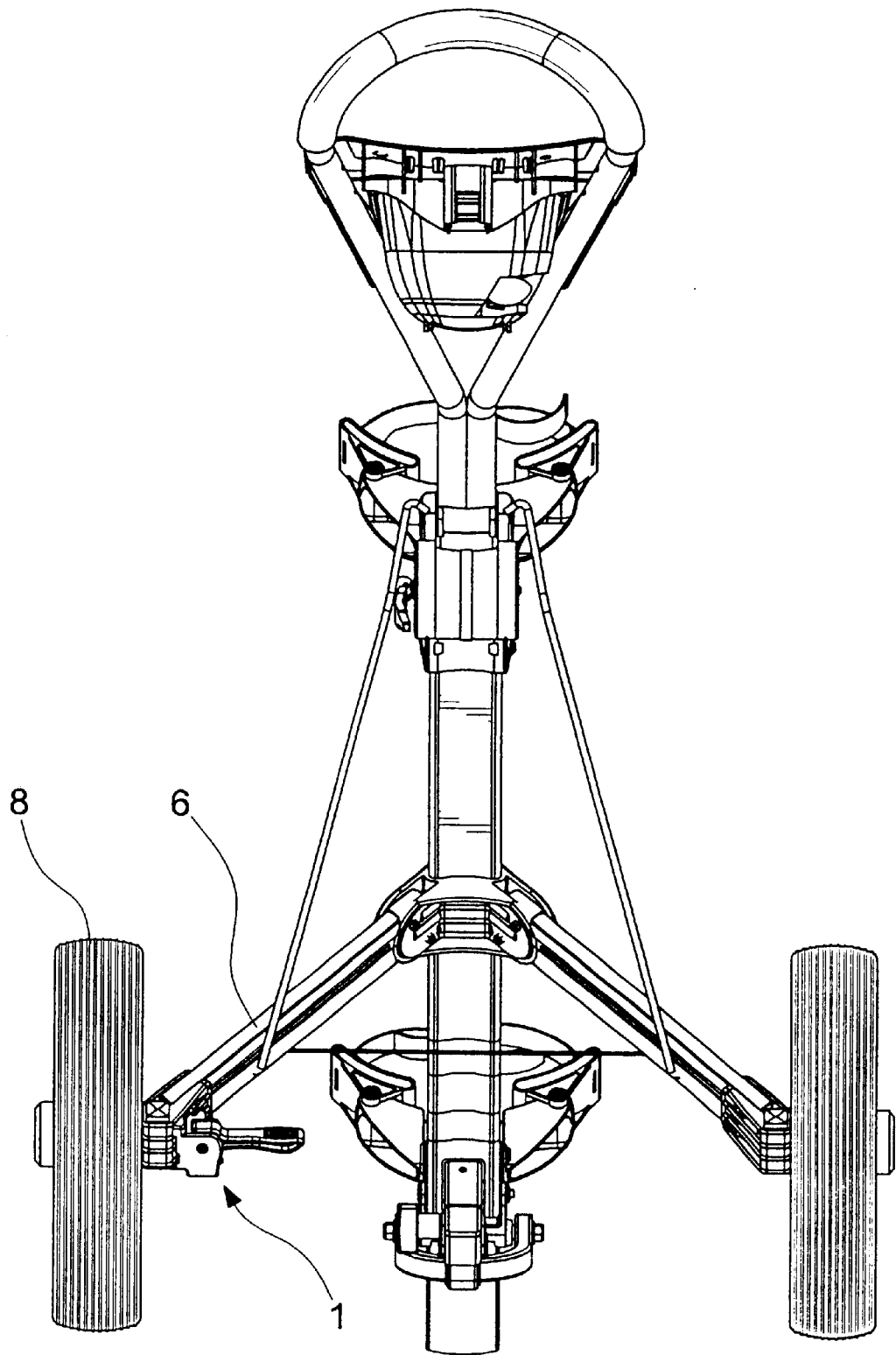
FIG. 1 is a rear view of a golf cart in accordance with a preferred embodiment of the present invention.
Figure 2:
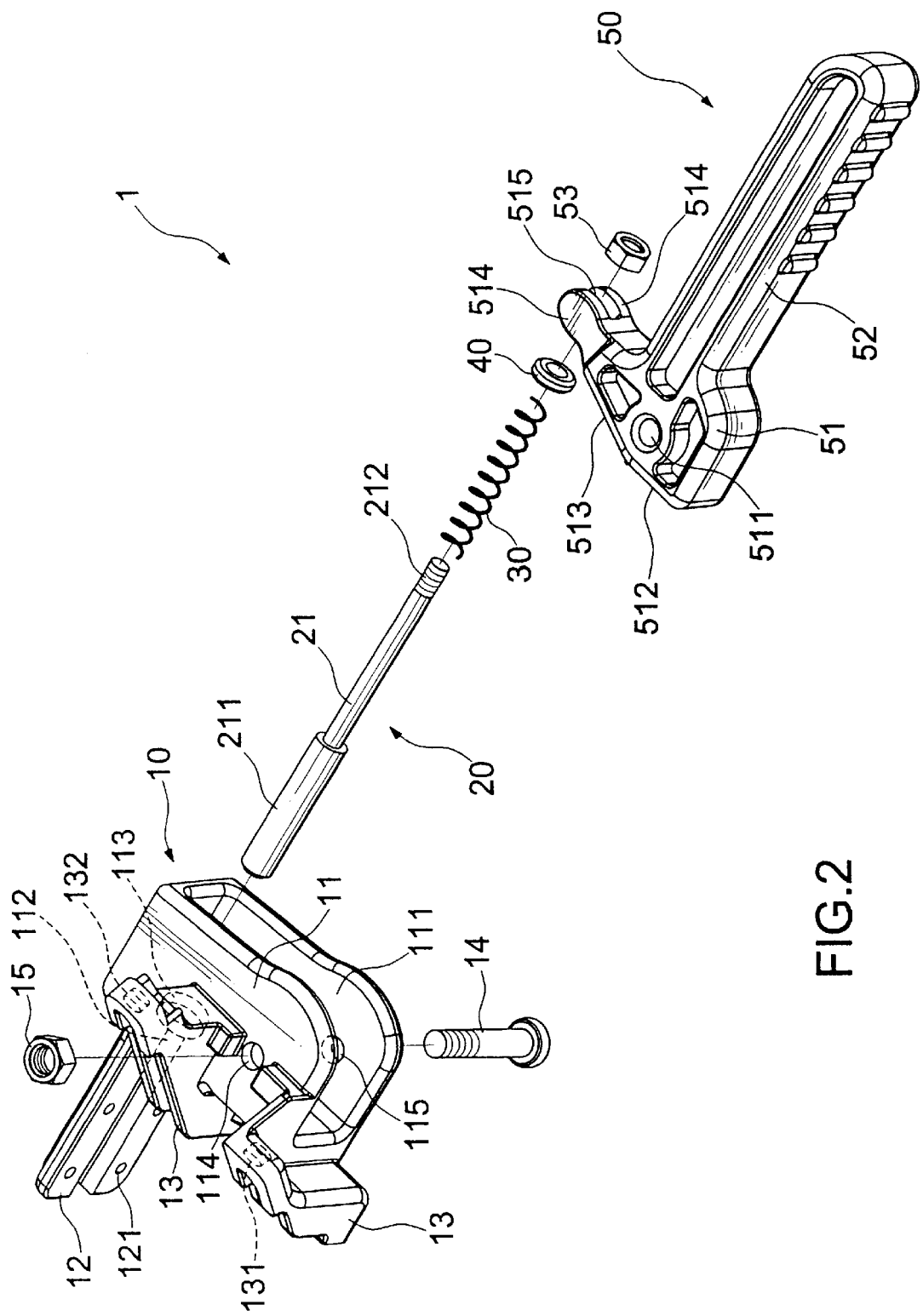
FIG. 2 is an exploded perspective view of a wheel stop device of a golf cart in accordance with a preferred embodiment of the present invention.
Figure 3:
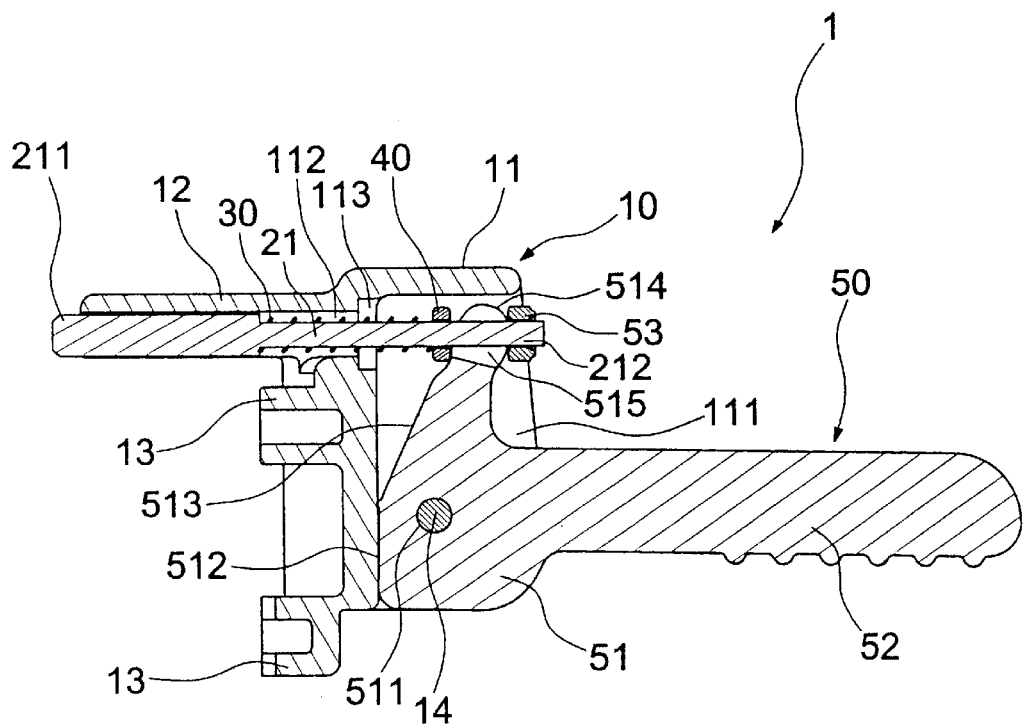
FIG. 3 is a side plan cross-sectional assembly view of the wheel stop device of a golf cart as shown in FIG. 2.

Referring to the drawings and initially to FIGS. 1–5, a wheel stop device 1 of a golf cart in accordance with a preferred embodiment of the present invention is mounted on a wheel shaft center seat 7 of a wheel frame 6 of a golf cart for stopping a wheel 8 of the golf cart, thereby preventing the wheel 8 from being rotated.

The wheel stop device 1 of a golf cart in accordance with a preferred embodiment of the present invention comprises a fixing seat 10, a connecting rod 20, a spring 30, a fixing ring 40, and a drive member 50.

The fixing seat 10 includes a main body 11, an outer jacket 12, and two opposite lugs 13.

The main body 11 has an inside formed with a hollow receiving chamber 111 which has a side wall formed with a through hole 112 which has one end formed with a recess 113. The main body 11 has an upper surface formed with a through hole 114, and a lower surface formed with a through hole 115 aligning with the through hole 114. The outer jacket 12 has a surface formed with multiple through holes 121. The two opposite lugs 13 are formed with through holes 131 and 132.

The connecting rod 20 is mounted in the through hole 112 of the receiving chamber 111 of the fixing seat 10, and has a shank 21 having a first end formed with a stop end 211 and a second end formed with a screw portion 212.

The spring 30 is mounted on the shank 21 of the connecting rod 20.

The fixing ring 40 is mounted on the shank 21 of the connecting rod 20 to mate with the spring 30.

The drive member 50 includes a press portion 51 and a drive portion 52.

The press portion 51 has a surface formed with a through hole 511, and has a front end face formed with an end face 512 and an oblique end face 513 which are combined to form a substantially inverted V-shaped front end face. The press portion 51 has a side protruded with two spaced opposite oblong ears 514 and a clamping recess 515 formed between the two spaced opposite oblong ears 514.

In assembly, the connecting rod 20 is extended through the through hole 112 of the receiving chamber 111 of the fixing seat 10, with the stop end 211 of the connecting rod 20 protruding outward from the through hole 112 of the receiving chamber 111 of the fixing seat 10. Then, the spring 30 and the fixing ring 40 are mounted on the shank 21 of the connecting rod 20. Then, the drive member 50 is mounted in the receiving chamber 111 of the fixing seat 10, with the end face 512 of the press portion 51 of the drive member 50 being rested on an inner wall of the receiving chamber 111 of the fixing seat 10.

At this time, the screw portion 212 of the connecting rod 20 passes through the clamping recess 515 of the press portion 51 of the drive member 50, and a nut 53 is screwed on the screw portion 212 of the connecting rod 20, so that the connecting rod 20 is secured on the drive member 50. In addition, the connecting rod 20 may provide an elastic retraction function by the spring 30.

When the drive member 50 is mounted in the receiving chamber 111 of the fixing seat 10, the through hole 511 of the press portion 51 of the drive member 50 aligns with the through holes 114 and 115 of the main body 11 of the fixing seat 10 to allow passage of a bolt 14 which may be screwed in and secured by a nut 15, so that the drive member 52 may be pivotally mounted on the fixing seat 10, thereby forming the wheel stop device 1 of a golf cart in accordance with a preferred embodiment of the present invention.

Figure 5:
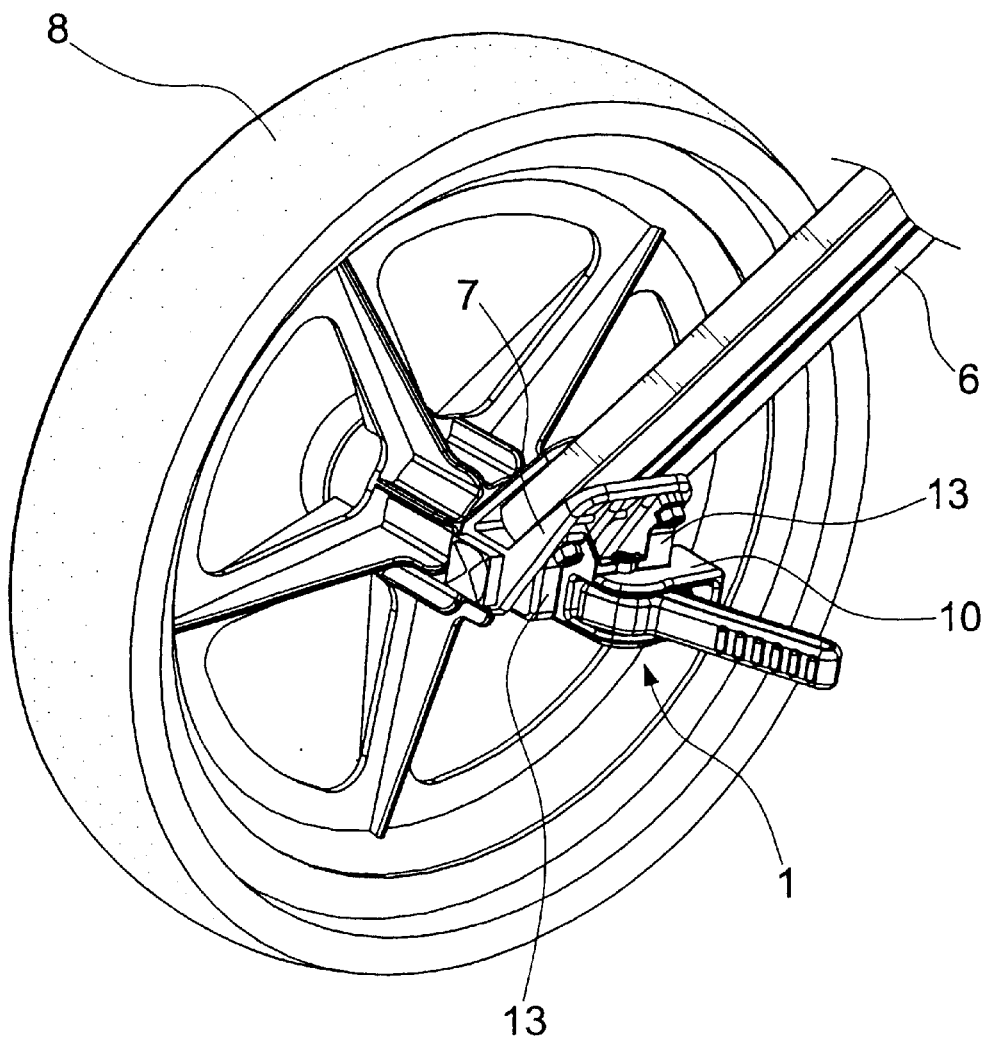
FIG. 5 is a perspective assembly view of a wheel stop device of a golf cart in accordance with a preferred embodiment of the present invention, wherein the wheel stop device is mounted on a wheel frame of a golf cart.

As shown in FIG. 5, the assembled wheel stop device 1 of a golf cart in accordance with a preferred embodiment of the present invention may be mounted on the wheel frame 6 of the golf cart. The through holes 131 and 132 of the opposite lugs 13 of the fixing seat 10 may mate with screws and nuts, so that the opposite lugs 13 of the fixing seat 10 may be locked and fixed on the wheel shaft center seat 7 of the wheel frame 6 of the golf cart for stopping the wheel 8 of the golf cart, thereby preventing the wheel 8 from being rotated.

Figure 6:
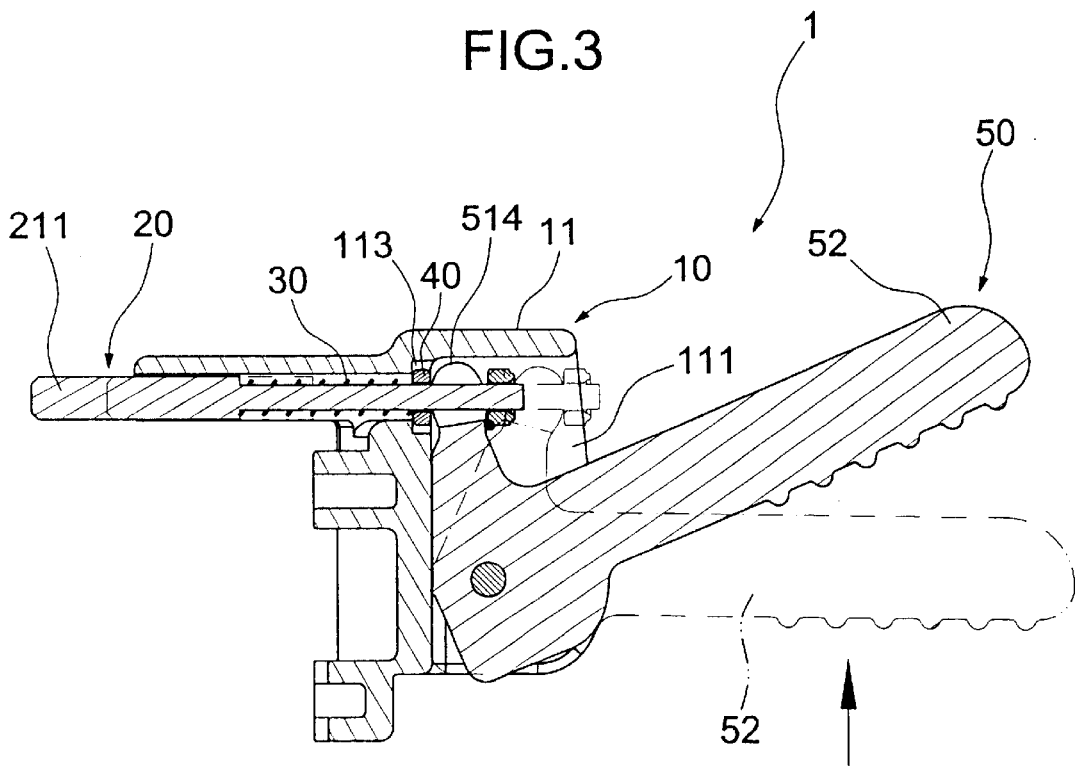
FIG. 6 is a cross-sectional operational view of the wheel stop device of a golf cart as shown in FIG. 3 in use.
Figure 4:
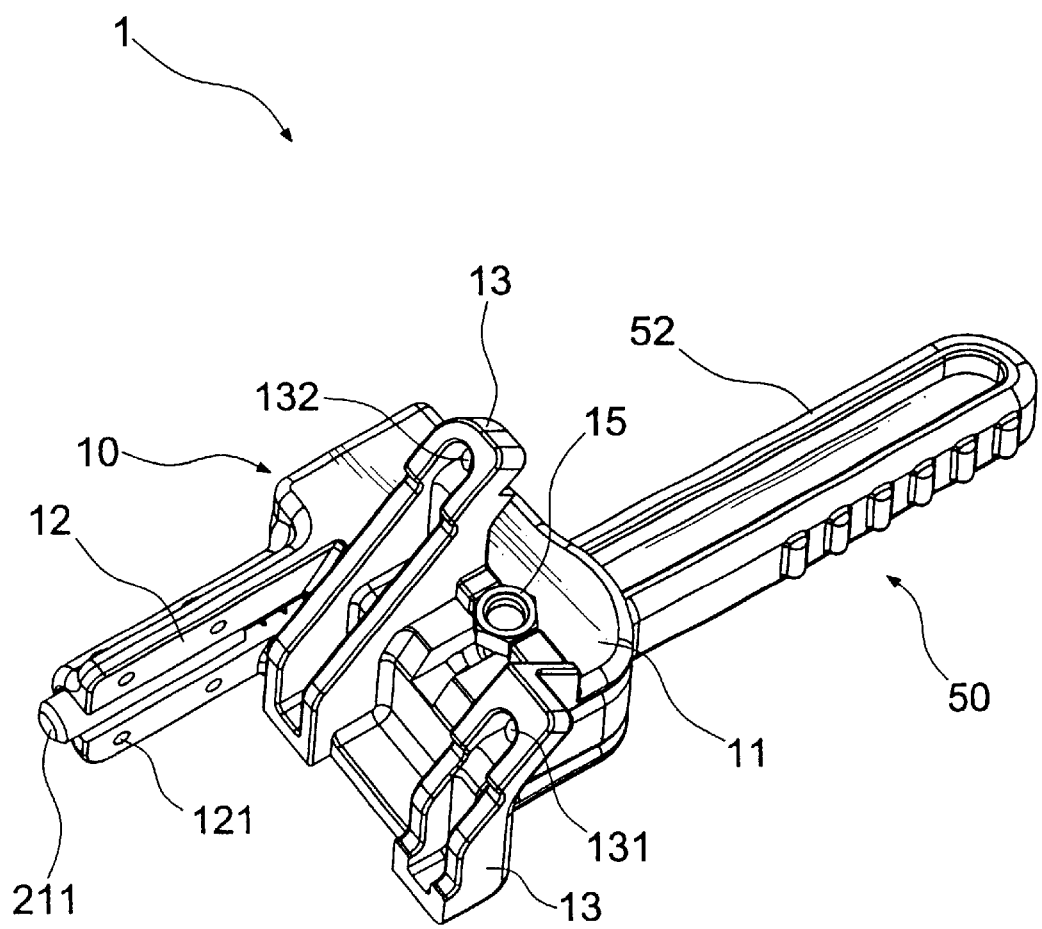
FIG. 4 is a perspective assembly view of a wheel stop device of a golf cart in accordance with a preferred embodiment of the present invention.

Referring to FIG. 6, the drive portion 52 of the drive member 50 may be directly moved by the user's one foot, to pivot the drive member 50, so that the oblique end face 513 of the press portion 51 of the drive member 50 may be moved to be rested on the inner wall of the receiving chamber 111 of the fixing seat 10. At the same time, the connecting rod 20 may be pushed by the oblong ears 514 of the press portion 51 of the drive member 50, so that the stop end 211 of the connecting rod 20 may be moved outward from the outer jacket 12 of the fixing seat 10, until the fixing ring 40 is received in the recess 113 of the receiving chamber 111 of the fixing seat 10.

Figure 7:
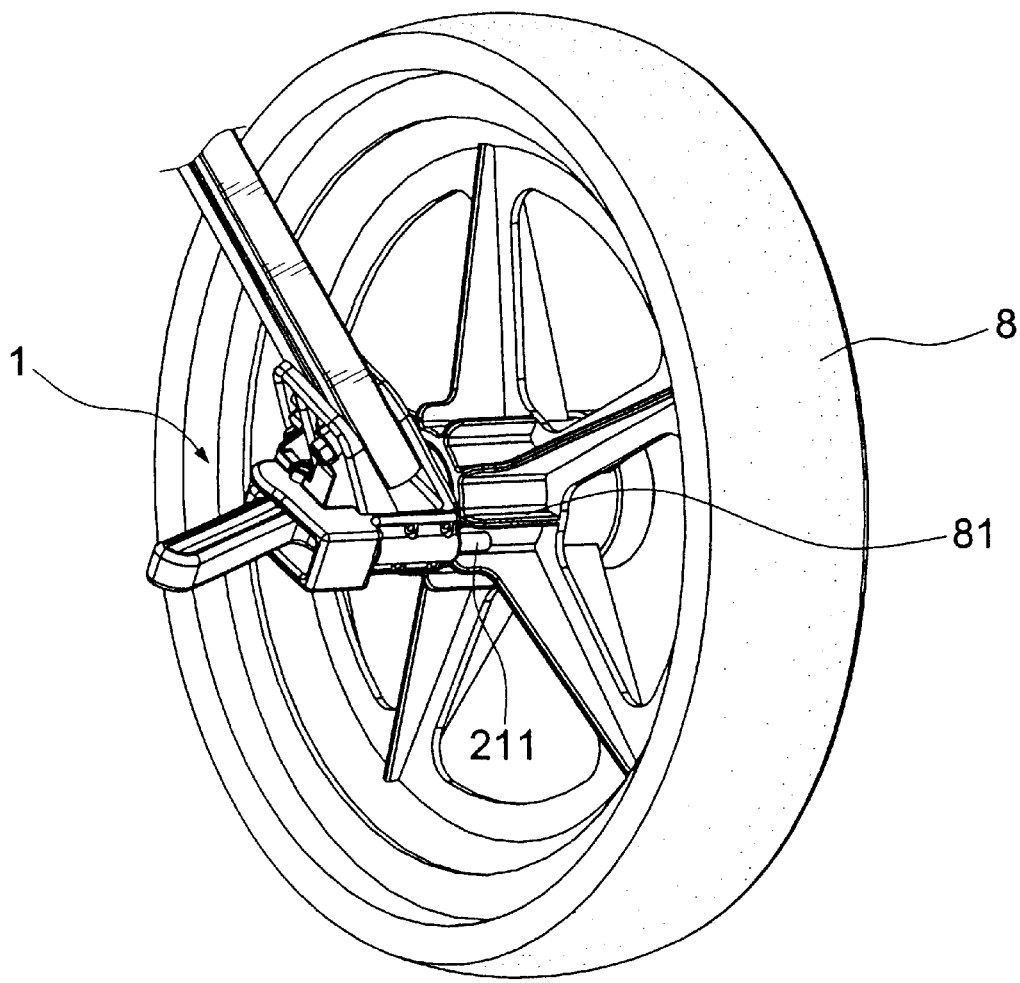
FIG. 7 is a schematic operational view of the wheel stop device of a golf cart as shown in FIG. 5 in use.

At this time, as shown in FIG. 7, the stop end 211 of the connecting rod 20 may be locked between the spokes 81 of the wheel 8, thereby locking the wheel 8 and stopping movement of the wheel 8.

Figure 8:
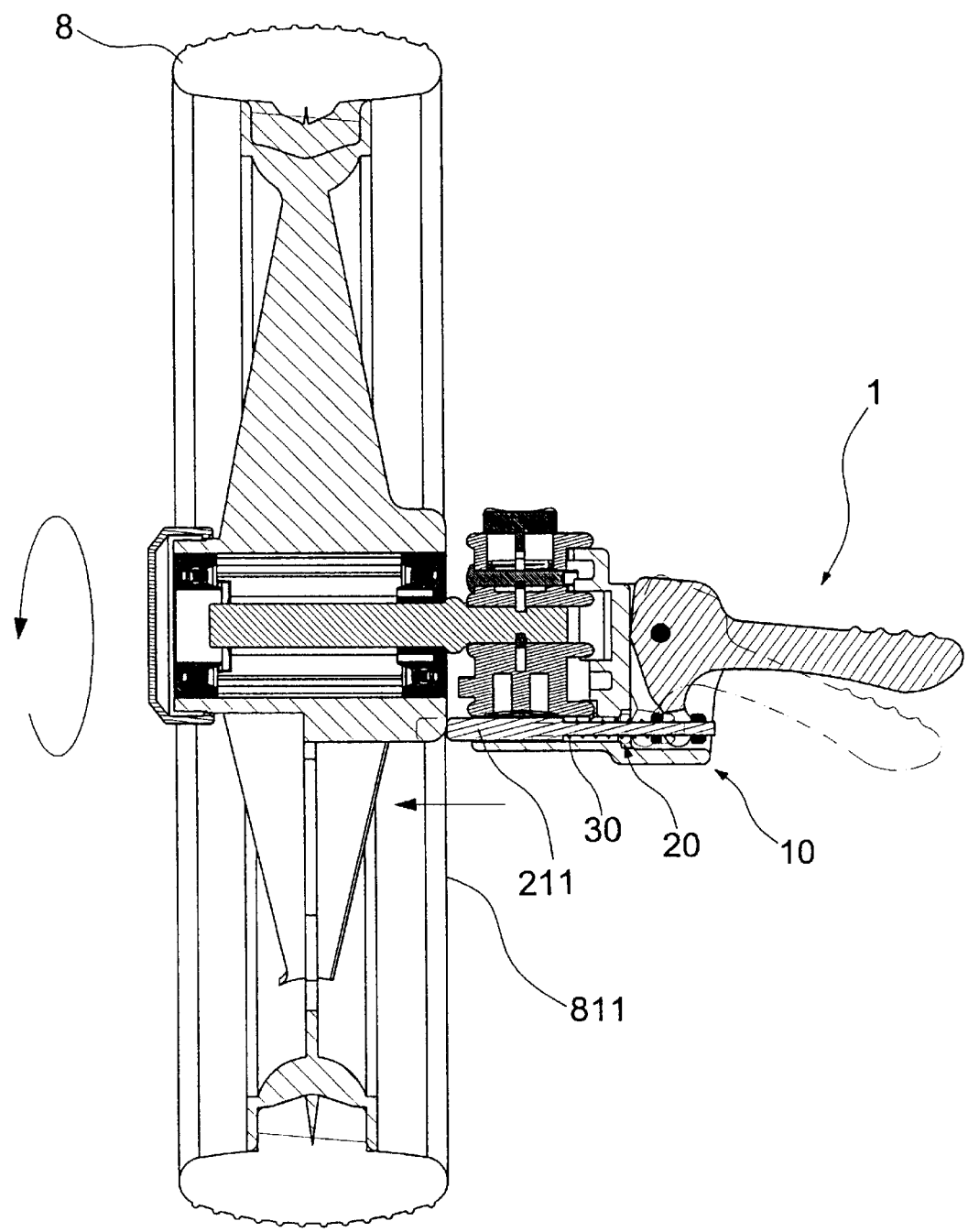
FIG. 8 is a cross-sectional operational view of the wheel stop device of a golf cart in accordance with a preferred embodiment of the present invention.

As shown in FIG. 8, when the stop end 211 of the connecting rod 20 is stopped by the end face 811 of the spokes 81 of the wheel 8, the connecting rod 20 may provide a buffer function by the elastic retraction design of the spring 30. Thus, the user only needs to slightly turn the tire so that the stop end 211 of the connecting rod 20 may be locked between the spokes 81 of the wheel 8 conveniently, thereby locking the wheel 8 and stopping movement of the wheel 8. In addition, the connecting rod 20 and the drive portion 52 of the drive member 50 will not be broken due to a large force.

Although the invention has been explained in relation to its preferred embodiment as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A wheel stop device of a golf cart, comprising a fixing seat, a connecting rod, a spring, a fixing ring, and a drive member, wherein:

the fixing seat includes a main body, an outer jacket, and two opposite lugs, the main body has an inside formed with a hollow receiving chamber which has a side wall formed with a through hole which has one end formed with a recess;

the connecting rod is mounted in the through hole of the receiving chamber of the fixing seat, and has a shank having a first end formed with a stop end and a second end formed with a screw portion;

the spring is mounted on the shank of the connecting rod;

the fixing ring is mounted on the shank of the connecting rod to mate with the spring; and the drive member includes a press portion and a drive portion, the press portion has a front end face formed with an end face and an oblique end face, the press portion has a side protruded with two spaced opposite oblong ears and a clamping recess formed between the two spaced opposite oblong ears.

2. The wheel stop device of a golf cart in accordance with claim 1, wherein the main body there are through holes, respectively, in the upper surface and the lower surface.

3. The wheel stop device of a golf cart in accordance with claim 1, wherein the outer jacket has a surface formed with multiple through holes.

4. The wheel stop device of a golf cart in accordance with claim 1, wherein the two opposite lugs are formed with through holes.

5. The wheel stop device of a golf cart in accordance with claim 1, wherein the press portion has a surface formed with a through hole.

6. The wheel stop device of a golf cart in accordance with claim 1, wherein the end face and the oblique end face of the press portion are combined to form a substantially inverted V-Shaped front end face.

* * * * *